United States Patent
Sommer et al.

(10) Patent No.: US 8,921,467 B2
(45) Date of Patent: Dec. 30, 2014

(54) BLOCK COPOLYMERS IN ADHESIVE DISPERSIONS

(71) Applicant: Henkel AG & Co. KGAA, Duesseldorf (DE)

(72) Inventors: Oliver Sommer, Duesseldorf (DE); Dirk Kasper, Duesseldorf (DE); Heike Eisfeld, Langenfeld (DE); Peter Ziskofen, Solingen (DE); Thomas Moeller, Duesseldorf (DE)

(73) Assignee: Henkel AG & Co. KGAA, Duesseldorf (DE)

( * ) Notice: Subject to any disclaimer, the term of this patent is extended or adjusted under 35 U.S.C. 154(b) by 16 days.

(21) Appl. No.: 13/721,225

(22) Filed: Dec. 20, 2012

(65) Prior Publication Data

US 2013/0109796 A1    May 2, 2013

Related U.S. Application Data

(63) Continuation of application No. PCT/EP2011/060617, filed on Jun. 24, 2011.

(30) Foreign Application Priority Data

Jun. 30, 2010    (DE) .......................... 10 2010 030 699

(51) Int. Cl.
| | |
|---|---|
| *C08K 5/00* | (2006.01) |
| *C08K 5/10* | (2006.01) |
| *C09J 153/00* | (2006.01) |
| *B32B 5/02* | (2006.01) |
| *C08J 5/04* | (2006.01) |
| *C09J 153/02* | (2006.01) |
| *C08J 3/07* | (2006.01) |
| *C08J 5/12* | (2006.01) |

(52) U.S. Cl.
CPC ................. *C09J 153/00* (2013.01); *B32B 5/02* (2013.01); *C08J 5/04* (2013.01); *C09J 153/005* (2013.01); *C09J 153/02* (2013.01); *C09J 153/025* (2013.01); *C08J 3/07* (2013.01); *C08J 5/127* (2013.01); *C08J 2353/00* (2013.01); *C08J 2353/02* (2013.01); *C08J 2453/02* (2013.01)
USPC .......................................... 524/225; 524/315

(58) Field of Classification Search
CPC ...................................................... C09J 153/00
USPC ........................................................ 524/225
See application file for complete search history.

(56) References Cited

U.S. PATENT DOCUMENTS

| | | | | |
|---|---|---|---|---|
| 5,292,795 | A * | 3/1994 | Southwick et al. ........... | 524/562 |
| 6,916,878 | B2 | 7/2005 | Bremser et al. | |
| 2003/0212213 | A1* | 11/2003 | Bendejacq et al. ........... | 525/242 |
| 2007/0015863 | A1* | 1/2007 | Matsunage et al. ........... | 524/505 |
| 2010/0261832 | A1* | 10/2010 | Magnet et al. ................ | 524/505 |

FOREIGN PATENT DOCUMENTS

| | | |
|---|---|---|
| EP | 1162233 A1 | 12/2001 |
| FR | 1541291 A | 10/1968 |
| GB | 2267284 A | 1/1993 |
| WO | 0048821 A1 | 8/2000 |

* cited by examiner

*Primary Examiner* — Hui Chin
(74) *Attorney, Agent, or Firm* — Sun Hee Lehmann

(57) ABSTRACT

An aqueous adhesive dispersion containing 25 to 70 wt % acrylate block copolymers and/or styrene block copolymers that have a molecular weight of more than 15,000 g/mol and at least two different glass transition temperatures, one glass temperature (Tg) being above 50° C., the other glass transition temperature below +10° C., as well as additionally further additives, the dispersion containing less than 0.5 wt % organic solvent.

13 Claims, No Drawings

BLOCK COPOLYMERS IN ADHESIVE DISPERSIONS

BACKGROUND OF THE INVENTION

The invention relates to an aqueous adhesive based on thermoplastic block copolymers. It is intended to contain only a small proportion of solvents. It can be used for the adhesive bonding of fibers or films.

Adhesives for bonding fibers are known. These can be reactive or non-reactive adhesives. Fibers of various kinds are known as fiber material. It is known, for example, that nonwoven substrates can be bonded to one another, or to plastic films, using adhesives. Such adhesive bonds are used, for example, in the manufacture of hygiene products. It is known that melt adhesives based on reactive polyurethanes can be used; liquid adhesives based on radiation-crosslinkable polymers are also known.

It is furthermore known that fibers can be adhesively bonded to yield high-strength fiber composites. In this context, fibers can be entirely incorporated into a polymer matrix. Polyurethanes or epoxy binding agents, for example, are known as a matrix material. EP 1161341 describes methods in which fibers in the form of fiber skeins or fiber fabrics are adhesively bonded to one another. A variety of polymers are listed as the adhesive, and solvent-containing adhesives, adhesive powders, adhesive dispersions are listed as the utilization form. For example, a powder made of a styrene block copolymer is used and bonded. This adhesive bond meets the requirements imposed in terms of adhesive strength and elasticity, so that these fibers can be connected to one another by pressing.

Powdered adhesives have the disadvantage, however, that they usually bond the fibers to one another only at single points. In addition, they must melt effectively in order to produce good adhesion to the surfaces. An alternative is to incorporate these adhesives into the melt. This, however, requires considerable equipment outlay for processing these melts. Damage to the substrate is, moreover, possible as a result of the high temperature.

Polymers are often manufactured in solvents. This enables appropriate synthesis, and adhesives manufactured therefrom are moreover easy to package and transport. In terms of their application, however, they have the disadvantage that considerable quantities of solvent are released. This is first of all critical from an environmental-engineering standpoint, and furthermore technical measures must also be taken to ensure industrial protection of employees. This requires considerable effort on the part of users. Organic solvents should therefore be decreased to the greatest extent possible in the context of adhesive bonding.

In addition, the styrene block copolymers that are often used are also not suitable for all purposes. These polymers are nonpolar. For a variety of fiber materials that optionally have an elevated number of polar groups, this can result in insufficient adhesion. It is possible for the fibers to be pretreated before processing, but these are additional, laborious working steps.

SUMMARY OF THE INVENTION

An object of the present invention is therefore to make available aqueous, thermoplastic adhesives based on block copolymers, which contain only a small proportion of solvent. These adhesives are intended to exhibit good adhesion to fiber materials. Processing is made easier by the low solvent content. Good adhesive properties can be obtained by way of the selection of the block copolymers. The polymers are intended to exhibit glass transition temperatures suitable for ensuring good load-bearing properties of the adhesive bond over a wide temperature range. A further object is to improve the shelf stability of the adhesive dispersion.

The object is achieved by an aqueous adhesive dispersion containing 25 to 70 wt % acrylate block copolymers and/or styrene block copolymers that have a molecular weight of more than 15,000 g/mol and at least two different glass transition temperatures (Tg), one Tg being above 50° C., the other Tg being below 10° C., as well as additionally further additives, the dispersion containing less than 0.5 wt % organic solvent.

A further subject of the invention is a method for manufacturing a solvent-free dispersion of block copolymers as a secondary dispersion, the polymers being dissolved in organic solvents and transferred into an aqueous phase, and the solvent content then being decreased by distillation.

DETAILED DESCRIPTION OF THE INVENTION

The dispersions according to the present invention can contain, as polymers, thermoplastic elastomers, for example block copolymers based on (meth)acrylates or styrene derivatives. The polymers can be of linear construction; star polymers can also be used. In general, the block copolymers are intended to have at least two different glass transition temperatures ($T_g$). One $T_g$ is intended to be between 50 and 130° C., in particular from 80 to 120° C.; the second is intended to be, for example, from −60 to +10° C., in particular from −45 to 0° C. Suitable polymers are intended to contain two or more blocks; they are preferably di-block or tri-block polymers. In particular, mixtures containing di- and tri-block copolymers are intended to be present.

One embodiment uses styrene block copolymers. These are polymers that contain block structures made of styrene or derivatives thereof, e.g. α-methylstyrene, as well as further copolymerizable unsaturated monomers such as ethylene, propene, butene, butadiene, isoprene, or similar monomers. These are intended to be linear or branched styrene block copolymers, the copolymers being alternating or graft copolymers. They can be di-block or tri-block polymers; multiple different blocks are also possible. Thermoplastic elastomers selected from styrene block copolymers, for example styrene and styrene-butadiene copolymers (SBS, SBR), styrene-isoprene copolymers (SIS), styrene-ethylene/butylene copolymers (SEBS), styrene-ethylene/propylene-styrene copolymers (SEPS), or styrene-isoprene-butylene copolymers (SIBS) are suitable, for example. The molecular weight is intended to be greater than 15,000 g/mol. Suitable styrene block polymers have two glass transition temperatures $T_g$, one intended to be above 80° C., the other intended to be below 10° C., in particular below 0° C.

Another preferred embodiment of the present invention uses (meth)acrylate block copolymers. These can be di-block, tri-block or multi-block copolymers. The individual blocks can also contain functional monomers that, for example, influence the polarity of the polymer. These can preferably be polymers having a narrow molecular-weight distribution. The monomers of the individual blocks are selected so that the polymer has one glass transition temperature ($T_g$) below +10° C., in particular below 0° C., and the second $T_g$ is greater than +50° C., in particular above 80° C.

Suitable monomers are esters of (meth)acrylic acid and of acrylic acid, such as alkyl(meth)acrylates of straight-chain, branched, or cycloaliphatic alcohols having 1 to 40 carbon atoms, such methyl(meth)acrylate, ethyl(meth)acrylate, n-butyl(meth)acrylate, isobutyl(meth)acrylate, t-butyl(meth) acrylate, 2-ethylhexyl(meth)acrylate, cyclohexyl(meth)acrylate; hydroxyfunctionalized (meth)acrylates, such as 3-hydroxypropyl(meth)acrylate, 3,4-dihydroxybutyl mono(meth) acrylate, 2-hydroxyethyl(meth)acrylate, 4-hydroxybutyl (meth)acrylate, 2-hydroxpropyl(meth)acrylate, 2,5-dimethyl-1,6-hexanediol mono(meth)acrylate, particularly preferably 2-hydroxyethyl methacrylate; ether-containing (meth)acrylates such as tetrahydrofurfuryl(meth)acrylate, 1-butoxypropyl methacrylate, furfuryl methacrylate, 2-butoxyethyl methacrylate, 2-ethoxyethyl methacrylate, allylmethyl methacrylate, 1-ethoxybutyl methacrylate, 1-ethoxyethyl methacrylate, ethoxymethyl methacrylate, poly(ethylene glycol)methyl ether(meth)acrylate, and poly(propylene glycol)methyl ether(meth)acrylate.

In addition to the aforementioned (meth)acrylates, the compositions to be polymerized can also comprise further unsaturated monomers that are copolymerizable with the aforesaid (meth)acrylates. These include, among others, 1-alkenes such as 1-hexene, 1-heptene, branched alkenes such as, for example, vinylcyclohexane, 3,3-dimethyl-1-propene, 3-methyl-1-diisobutylene, acrylonitrile, vinyl esters such as e.g. vinyl acetate, styrene, substituted styrenes such as α-methylstyrene and α-ethylstyrene, vinyl toluene, and p-methylstyrene; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinyl oxolan, vinyl furan, vinyl oxazoles, vinyl piperidine, 1-vinylimidazole, N-vinylpyrrolidone, 2-vinylpyrrolidone, N-vinylpyrrolidine, 3-vinylpyrrolidine, N-vinylcaprolactam, and isoprenyl ether; maleic acid derivatives such as, for example, maleic acid anhydride, maleinimide, and others.

These can be, for example, acrylate/olefin block copolymers, acrylate/vinyl monomer or preferably acrylate/acrylate block copolymers. In particular, the block having a higher $T_g$ is constructed on the basis of methacrylate esters.

A further embodiment uses other rubber-elastic block copolymers. Examples thereof are polyester-urethane, ethylene-acrylate copolymers, butyl rubber, natural rubber, and ethylene-propylene copolymers. These polymers can also be used as parts of a mixture with other polymers. Adhesive properties such as adhesion, elasticity, melting behavior, dispersion stability can thereby be influenced. In order to influence the polarity of the block copolymers, it is possible for polar functional groups, for example an OH group, COOH groups, to be present in polymers by way of functionalized monomers or as a result of reactions of the polymer chains. Nonpolar groups are, however, also possible. These can influence the dispersion capability of the polymers in water, and can furthermore influence adhesion to substrates. Preferably, however, no self-crosslinking groups are intended to be present.

Methods for manufacturing block copolymers are known; these can involve solvent polymerization, and the known initiators can be used. There are a number of methods for manufacturing block copolymers. One skilled in the art can select these based on the monomers to be used. They are manufactured in organic solvents or in solvent-free fashion. Suitable polymers are commercially obtainable in various compositions.

An adhesive according to the present invention can optionally also contain further additives, such as adhesion promoters, plasticizers, stabilizers, bactericides, tackifying resins, waxes, pigments, fillers, pH-regulating substances, surfactants, emulsifiers, wetting agents, or thickeners.

Examples of plasticizers are medicinal white mineral oils, naphthenic mineral oils, polypropylene or polybutylene or polyisoprene oligomers, hydrogenated polyisoprene and/or polybutadiene oligomers, benzoate esters, phthalate esters, adipic acid esters, sulfonic acid esters, phosphoric acid esters, vegetable or animal oils and derivatives thereof, polypropylene glycol, polybutylene glycol, polymethylene glycol and ethers thereof. These plasticizers are used by preference to adjust the flow behavior or flexibility. The quantity can be 0%, or up to 15 wt % can be used, based on the adhesive solids.

Waxes can also be contained. For example, waxes can be added to the adhesive in quantities from 0 to 15 wt %. The wax can be of natural or synthetic origin. Natural waxes that can be used are vegetable waxes, animal waxes, mineral waxes, or petrochemical waxes. Chemical waxes that can be used are hard waxes such as montan ester waxes or sasol waxes. As synthetic waxes, polyalkylene washes and polyethylene glycol waxes are utilized. Other suitable waxes are petrochemical waxes such as petrolatum, polyethylene waxes, polypropylene waxes, Fischer-Tropsch waxes, paraffin waxes, or microcrystalline waxes.

Suitable stabilizers are substances that protect the adhesives from decomposition by water or light. An adhesive according to the present invention can, for example, contain up to 3 wt %, by preference up to 2 wt %, antioxidants or UV stabilizers. An embodiment is substantially free of pigments and fillers.

Suitable tackifying resins are, for example, hydrocarbon resins such as terpene resins, coumarone/indene resins; aliphatic petrochemical resins; hydrocarbon resins based on unsaturated CH compounds, or modified phenol resins, or colophon resins and derivatives. These are, for example, hydroabietyl alcohol and esters thereof, modified natural resins such as resin acids from balsam resin, tall resin, or wood rosin, colophon and its derivatives, terpene resins, or in particular aromatic, aliphatic, or cycloaliphatic hydrocarbon resins, as well as modified or hydrogenated versions thereof. The quantities, based on the adhesive solids, are to be 0%, for example, in the acrylate copolymer embodiment, or in another embodiment can be up to less than 25 wt %, in particular above 10 wt %, for example in the embodiment with styrene copolymers.

It is useful according to the present invention for the adhesive to contain by preference at least one surface-active substance. These are understood as substances that decrease surface tension with respect to water, such as defoamers, surfactants, wetting agents. As a rule they contain hydrophilic and hydrophobic, in particular lipophilic, groups. A part of the surface-active substances can be added, prior to dispersion, to the water phase or to the dissolved polymer phase. They serve for wetting, to avoid foam, and to stabilize those portions of polymers and additives which are not water-soluble of themselves. Anionic, nonionic, cationic, or ampholytic surfactants, or mixtures of two or more thereof, can be contained.

Examples of suitable anionic surfactants are alkyl sulfates, alkyl and alkylaryl ether sulfates, such as alkylphenol ether sulfates, fatty alcohol sulfonates, fatty alcohol ether sulfonates, in particular alkylsulfonates, alkylarylsulfonates, taurides, esters and semi-esters of sulfosuccinic acid, which optionally can be ethoxylated, alkali and ammonium salts of carboxylic acids, for example of fatty acids, phosphoric acid partial esters, and alkali and ammonium salts thereof.

Examples of ampholytic surfactants are long-chain-substituted amino acids such as N-alkyl-di(aminoethyl)glycine or N-alkyl-2-aminopropionic acid salts, betaines such as N-(3-acylamidopropyl)-N,N-dimethylammonium salts, or alkylimidazolium betaines.

Examples of nonionic surfactants are alkylpolyglycol ethers, alkylarylpolyglycol ethers, fatty alcohol polyglycol ethers, fatty alcohol EO/PO adducts and alkylphenol EO/PO adducts, ethylene oxide/propylene oxide (EO/PO) block copolymers, by preference those having approximately 8 to approximately 50 EO and/or PO units, addition products of alkylamines, fatty acids and resin acids, alkylpolyglycosides having linear or branched, saturated or unsaturated alkyl residues with an average of 8 to approximately 24 carbon atoms and an oligoglycoside residue, natural substances and derivatives thereof such as lecithin, lanolin, or sarcosine, polar-group-containing linear organo(poly)siloxanes, in particular those having alkoxy groups with up to 10 carbon atoms and up to approximately 50 EO or PO groups.

Alternatively or additionally, an adhesive dispersion according to the present invention can contain a protective colloid. This can involve the use of anionic or nonionic substances. Examples thereof are natural polymers such as starch ethers and/or cellulose ethers, or derivatives thereof, e.g. modified by oxidation, esterification, etherification, acid breakdown, in particular hydroxyalkyl ether starches, hydroxyalkyl celluloses, carboxyalkyl celluloses, carboxyalkyl ether starches; dextrins, or hydroxyalkyl dextrins. These can be used individually or in a mixture.

Also suitable are polyvinylpyrrolidone or polycarboxylic acids such as poly(meth)acrylic acid, optionally in the form of copolymerizates with esters (optionally carrying OH groups) of (meth)acrylic acid, or polyacrylamide and its derivatives. In addition, polyvinyl alcohol, for example having a degree of hydrolysis between 70 and 90%, can also be present as a protective colloid.

The protective colloids are intended, optionally also after neutralization, to be anionic or neutral. Such products are commercially obtainable and can be selected by one skilled in the art on the basis of their properties.

According to the present invention the adhesive dispersion is intended to contain 0.01 to 10 wt % surfactants and/or protective colloids, in particular from 0.1 to 5 wt %, based on the adhesive solids.

The adhesive dispersion according to the present invention contains a water phase and a polymer phase. The water phase evaporates after application, and a solid adhesive phase results. It is necessary according to the present invention for the dried adhesive to exhibit two different glass transition temperatures (Tg). The lower glass transition temperature of the adhesive is intended to be below 10° C., in particular below 0° C. The upper Tg is intended to be greater than 50° C., in particular greater than 80° C. The glass transition temperature is determined by the selection of the polymers. It is further influenced by the additional additives, such as plasticizers or tackifying resins.

An embodiment of an adhesive according to the present invention contains, based on the adhesive solids, 60 to 90 wt % of one or more block copolymers, 0 to 30 wt % tackifying resins, 0.5 to 3% stabilizers, and 0 to 15 wt % emulsifiers or protective colloids. The sum of the constituents is intended to yield 100%. A particular embodiment comprises no tackifying resins; another embodiment contains 10 to 25 wt % tackifying resins, in particular synthetic resins.

The adhesive dispersion according to the present invention is substantially free of organic solvents, i.e. the content is intended to be less than 0.5% (based on the dispersion). The pH of the dispersion is intended to be between pH 6 and 10. This can optionally also be adjusted subsequently by adding acids or bases. A particularly suitable embodiment manufactures the adhesive dispersion as a secondary dispersion.

A further subject of the invention is a method for manufacturing an aqueous adhesive dispersion, said dispersion being intended to comprise only a small proportion of organic solvents. The polymer or polymer mixture is, in this context, dissolved in an organic solvent. A aqueous, solvent-containing dispersion is then generated, from which the solvent is then removed by distillation.

Dissolution can be assisted, if applicable, by heating, for example to 80° C., and stirring. The solvent is selected so that on the one hand it exhibits a good dissolving effect, and on the other hand can also be removed from the subsequent aqueous phase by distillation. Solvents or mixtures that have a boiling point below 150° C. (1013 mbar), preferably between 65 and 130° C., are particularly suitable. Examples thereof are aromatic inert compounds such as toluene; hydrocarbons such as cyclohexane; carboxylic acid esters such as ethyl acetate, butyl acetate, ethyl propionate; ketones such as methyl isobutyl ketone or acetone; alcohols, in particular $C_1$ to $C_5$ alcohols, such as ethanol, butanol, isopropanol, or tert-alkylamines. In particular, esters of $C_1$ to $C_3$ carboxylic acids with $C_1$ to $C_6$ alcohols can also be used. Aromatic or aliphatic hydrocarbons can be used as a solvent. Additional constituents and additives such as resins, plasticizers, stabilizers can also be added in this method step. It is advantageous in particular that a sufficient quantity of emulsifiers and/or protective colloids is added to the organic solvent.

A aqueous phase is also manufactured, which can be manufactured from water, emulsifiers, and/or foamers by mixing. The pH of the aqueous phase can optionally be adjusted by way of a pH regulator. It is also possible to mix all the additives into the polymer phase.

The two phases are then mixed. This can occur, for example, in such a way that the organic solution of the binding agent is incorporated into a heated aqueous phase with rapid stirring. The quantity of organic phase is regulated so that rapid and good dispersion in the water phase occurs. A dispersion of organic particles in water is then obtained.

Another procedure is such that the water phase and polymer phase are brought together simultaneously in a mixer. This can likewise be assisted by heating the phases. The size of the dispersed particles in this context is dependent on the shear force that is introduced. It is possible, optionally, to run a corresponding dispersion repeatedly through a mixer.

Once the dispersion has been manufactured it is distilled, preferably under vacuum. The vacuum, and the temperature of the dispersion phase, are chosen so that the selected solvent distills off effectively. It is useful if the temperature in the context of distillation is below 120° C., in particular below 70° C. Distillation is carried out until the product is low in solvent. It is useful according to the present invention if the residual solvent content of the dispersion is less than 0.5 wt % (based on the dispersion). In the context of distillation, a defoamer can be added to the dispersion if necessary. An embodiment of the method does not use any aromatic solvents such as toluene.

In order to ensure a sufficiently stable aqueous dispersion, its parameters can then be adjusted. For example, the pH can be adjusted by adding a pH regulator. It is furthermore possible to establish a suitable solids content by adding water. The viscosity can likewise be adjusted by adding a thickener. The dispersion can furthermore be filtered, thereby removing coarse, poorly dispersed particles.

The dispersion is intended to have an average particle size from 0.1 to 10 μm, in particular less than 5 μm. The D50 value is determined as the average particle diameter. The solids content of a dispersion is between 25 and 75 wt %, in particular 35 to 65 wt %. The adhesive dispersion is intended to have, at 25° C., a viscosity below 5000 mPas, in particular between 200 and 2000 mPas. It is known to manufacture a shelf-stable form having a higher solids content, which is then diluted before application to a lower solids content.

The dispersions manufactured according to the present invention are shelf-stable. No substantial settling of dispersion particles is observable, and the particle size is likewise constant over a longer period of time. The dispersions according to the present invention are practically solvent-free. They have a low viscosity, and can be applied onto suitable substrates in a thin layer and in small quantities.

A further subject of the invention is the use of the above-described adhesive dispersions for adhesively bonding fibrous substances. Suitable substrates are, for example, known fibrous substrates. These can be nonwoven substrates; they can be fiber bundles such as rovings, and fiber fabrics can also be coated. The fibers known for fiber composite materials can be used as fibers. These can be glass fibers, quartz fibers, carbon fibers, polyester fibers, polyolefin fibers, polyaramid fibers, or polyacrylonitrile fibers. The fibers can be selected on the basis of the intended application. It is likewise known that a suitable form for the fibers is selected in accordance with the mechanical requirements of the substrates that are manufactured. The fibers can be bonded in oriented fashion, or multiple layers are bonded with orientations differing from one another. It is furthermore known to bond such fibers to other substrates, such as (composite) films or ceramic plates. Such fibers in composite materials are used, for example, in aircraft construction, in residential construction, in vehicle construction, for blades of wind-power rotors, or for other highly mechanically stressed components. In another application sector, nonwoven substrates can also be bonded to one another or to films; the bonded products can continue to remain flexible thereafter.

The adhesive dispersions according to the present invention can be applied onto the substrates in a variety of ways. For example, it is possible for the corresponding fibers, fabrics, or nonwoven articles to be provided with the adhesive dispersion by spray application. Another application form impregnates the fiber materials with the adhesive. Another embodiment of the invention coats the fiber materials on the surface, by passing the fiber materials through an aqueous dispersion of the adhesive. Another embodiment applies the adhesive in such a way that only portions of the fibers are coated, i.e. they are bonded only in individual regions. Depending on the working approach, it is possible to dry the adhesives applied onto the fiber material. This can be achieved, for example, by heating and by removing the volatile constituents. Evaporation of the volatile components can be facilitated by heating carrier materials; it is furthermore possible to drive off the water and other volatile constituents by blowing on dry gases or heated gases. Precoated materials that have a dry surface are thereby produced. These are of not inherently tacky, and can be stored as intermediate products.

According to an embodiment, composite materials can then be manufactured from these intermediate products, the coated fiber materials being packaged and converted into an appropriate shape. It is then possible, by the application of pressure and heat, to connect the thermoplastic adhesive and the fibers to one another. The temperature depends on the substrates, which should not be damaged. For example, the temperature can be below 200° C., preferably below 140° C., in particular below 100° C. A plurality of bonding points are produced in this context in the bonded fiber material, which together yield a dimensionally stabile substrate. The shape of the substrates can furthermore be selected within limits. They depend in principle on the application sector of the manufactured bonded shaped parts.

A further embodiment uses the adhesive dispersions as a sealing adhesive. That surface of a packaging material, which is subsequently to be sealed, is, in this context, coated with an adhesive according to the present invention and dried. The layer can later be sealed under pressure to another layer, and can form a package seam. This can be carried out as a heat seal method or also as a cold seal method. The procedure according to the present invention allows heating of the surfaces being bonded to be decreased, and stress on sensitive substrates is reduced.

Another use of the adhesives according to the present invention is the adhesive bonding of flexible fiber substrates to flexible films to yield composite materials. These can then be used as a functional material in the textile industry. Fairly low temperatures for activation of the adhesive are suitable for this application instance.

The dispersions according to the present invention make available low-viscosity adhesives. Application onto the various fiber materials can occur, for example, in a thin layer. The adhesive used is moreover solvent-free. No health-endangering organic solvents or other organic volatile substances are released, even during processing and subsequent heating. Requirements in terms of additional industrial hygiene measures can thereby be reduced. In addition, damage to the substrates due to swelling of the surface is decreased.

Selection of the polymers as block copolymers ensures that the bonded substrates withstand a high level of mechanical loading. They exhibit excellent flexibility, but a stable adhesive bond still exists even at higher temperatures. Because the materials are thermoplastic, bonded materials can withstand mechanical deformation in the context of a temperature increase. In the application form as a seal coating as well, good adhesion to the substrates is obtained. Closure of the packages can take place at low temperature, so that the packaged objects or the films are not unnecessarily exposed to temperature stress.

Measurement methods of the invention:
Glass transition temperature $T_g$: measured by DSC
Solids: measured per DIN 53189 at 105° C.
Viscosity: measured per Brookfield, EN ISO 2555, 25° C.
Particle size: measured using the light scattering principle: the D50 value is the value at which 50 vol % of the particles are smaller than the indicated value, measured with a Coulter Counter
Molecular weight: number-average molecular weight ($M_N$), determinable via GPC against a styrene standard.

EXAMPLE 1

Secondary Dispersion with Styrene Block Copolymer Constituents:

| | |
|---|---|
| Styrene block copolymer | 144 g ($M_N$ approx. 210,000 g/mol) |
| Hydrogenated hydrocarbon resin | 47 g |
| Irganox 1010 | 5 g (stabilizer) |
| Isopropanol | 80 g |
| Toluene | 705 g |
| Water | 529 g |
| Anionic emulsifier | 4.1 g |
| Nonionic emulsifier | 7.9 g |

The block copolymer and solvent are dissolved while stirring and being heated to 75° C. The resins, the stabilizer, and the nonionic emulsifier are then added, and homogenized with continuous stirring.

An aqueous solution is produced from water and the anionic emulsifier, and heated to a temperature of approx. 75° C.

The aqueous phase is made ready and mixed in a rotor-stator mixer, and the polymer phase (heated to approx. 80° C.) is slowly added and homogenized. The emulsion is completely manufactured after approx. 2 min at maximum stirring speed. If necessary, a small proportion of a defoamer can also be added to the dispersion.

The corresponding emulsion is transferred while hot into a glass apparatus that comprises a stirrer and a distillation attachment. A negative pressure of approx. 450 mbar is applied, and the dispersion is heated while stirring. The solvent is distilled off at a temperature of approx. 50° C. Distillation is terminated when the solvent content is less than 0.5%.

The solvent is then filtered.

| | |
|---|---|
| Average particle size | 1.5 μm |
| Solids | 40 to 43% |
| pH | 9 |
| Viscosity (approx.) | 300 mPas (25° C., spindle 2) |

EXAMPLE 2

Secondary Dispersion with Acrylate Block Copolymer Constituents:

| | |
|---|---|
| Acrylate block copolymer | 144 g (methyl methacrylate, butyl acrylate, $T_g$ 100-120° C., Tg approx. −45° C.) |
| Nonionic emulsifier | 8 g |
| Irganox 1010 | 5 g |
| Ethyl acetate | 790 g |
| Water | 520 |
| NaOH | approx. 0.6 g |
| Anionic emulsifier | 11.7 g |

The working procedure is in accordance with Example 1, except that the nonionic surfactant is added to the polymer phase, and the anionic surfactant to the water phase. After filtration, the viscosity is adjusted as necessary using a thickener.

| | |
|---|---|
| Solids | 43 to 45 wt % |
| pH | 8 |
| Average particle size | 0.5 μm |
| Viscosity (approx.) | 300 mPas (25° C., spindle 2) |

EXAMPLE 3

Secondary Dispersion with Acrylate Block Copolymer Constituents:

| | |
|---|---|
| Acrylate block copolymer | 171 g |
| Colophon resin | 29 g |
| Nonionic emulsifier | 8 g |
| Irganox 1010 | 5 g |
| Ethyl acetate | 790 g |
| Water | 520 |
| NaOH | approx. 0.6 g |
| Anionic emulsifier | 11.7 g |

The working procedure is in accordance with Example 2. A thickener is then added to the dispersion

| | |
|---|---|
| Thickener | 30.5 g |
| Solids | 41 to 44 wt % |
| pH | 8 |
| Average particle size | 0.5 μm |
| Viscosity (approx.) | 300 mPas |

The invention claimed is:

1. An aqueous adhesive dispersion comprising:
 (a) 25 to 70 wt % of an acrylate block copolymer that has (i) a number-average molecular weight of more than 15,000 g/mol and (ii) at least two different glass transition temperatures, wherein the first glass transition temperature is 50° C. to 130° C. and the second glass transition temperature is −60° C. to +10° C.; and
 (b) an additive;
 wherein the dispersion is substantially free of any tackifying resin;
 wherein the dispersion contains less than 0.5 wt % of an organic solvent; and
 wherein the dispersion has an average particle diameter ($D_{50}$) from 0.1 μm to 10 μm.

2. The aqueous adhesive dispersion according to claim 1, wherein the block copolymer contains polar groups.

3. The aqueous adhesive dispersion according to claim 1, wherein the additive is an anionic emulsifier.

4. The aqueous adhesive dispersion according to claim 1, wherein the dispersion is free of pigments or fillers.

5. An aqueous adhesive dispersion, comprising:
 (a) 25 to 70 wt % of a styrene block copolymer that has (i) a number-average molecular weight of more than 15,000 g/mol and (ii) at least two different glass transition temperatures, wherein the first glass temperature is 80° C. to 130° C. and the second glass transition temperature is −60° C.;
 (b) 10 to 25% of a synthetic resin; and
 (c) an additive;
 wherein the dispersion contains less than 0.5 wt % of an organic solvent; and
 wherein the dispersion has an average particle diameter ($D_{50}$) from 0.1 μm to 10 μm.

6. A method for manufacturing an aqueous adhesive dispersion according to claim 1, wherein the dispersion is manufactured by manufacturing a solution of the block copolymers together with resins and/or additives in organic solvents, dispersing the polymer solution in an aqueous phase that can optionally contain neutralizing agents, emulsifiers, and/or defoamers, distilling off the solvent, optionally under vacuum, where the organic solvents used are aromatic solvents, ketones, $C_1$ to $C_5$ alcohols, esters of $C_1$ to $C_6$ alcohols with $C_1$ to $C_6$ carboxylic acids, hydrocarbons, having a boiling point below 150° C.

7. The method according to claim 6, wherein the solvent mixture is free of aromatic or aliphatic hydrocarbons.

8. The method according to claim 6, wherein the distillation is carried out under vacuum at a temperature below 120° C.

9. The aqueous adhesive dispersion of claim 1, wherein the acrylate block copolymer contains individual monomer blocks selected from the group consisting of methyl (meth) acrylate, ethyl (meth)acrylate, n-butyl (meth)acrylate, isobutyl (meth)acrylate, t-butyl (meth)acrylate, 2-ethylhexyl (meth)acrylate, cyclohexyl (meth)acrylate, 3-hydroxypropyl (meth)acrylate, 3,4-dihydroxybutyl mono(meth)acrylate, 2-hydroxyethyl (meth)acrylate, 4-hydroxybutyl (meth)acrylate, 2-hydroxypropyl (meth)acrylate, 2,5-dimethyl-1,6-hexanediol mono(meth)acrylate, 2-hydroxyethyl methacrylate tetrahydrofurfuryl (meth)acrylate, 1-butoxypropyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, polyethylene glycol)methyl ether (meth)acrylate, and poly(propylene glycol)methyl ether (meth)acrylate and mixtures thereof.

10. The aqueous adhesive dispersion of claim 9, wherein the acrylate block copolymer contains individual monomer blocks selected from the group of methyl methacrylate, t-butyl (meth)acrylate and n-butyl (meth)acrylate.

11. The aqueous adhesive dispersion of claim 1, wherein the glass transition temperatures of the first glass transition temperature is above 80° C. and the second glass transition temperature is less than 0° C.

12. The aqueous adhesive dispersion of claim 5, wherein the styrene block copolymer are selected from the group consisting of styrene butadiene rubber (SBR), styrene-butadiene copolymer (SBS), styrene-isoprene copolymer (SIS), styrene-ethylene/butylene copolymer (SEBS), styrene-ethylene/propylene-styrene copolymers (SEPS), styrene-isoprene-butylene copolymers (SIBS) and mixtures thereof.

13. The aqueous adhesive dispersion according to claim 5, wherein the additive is an anionic emulsifier.

\* \* \* \* \*

UNITED STATES PATENT AND TRADEMARK OFFICE
CERTIFICATE OF CORRECTION

PATENT NO.        : 8,921,467 B2                                   Page 1 of 1
APPLICATION NO.   : 13/721225
DATED             : December 30, 2014
INVENTOR(S)       : Oliver Sommer et al.

It is certified that error appears in the above-identified patent and that said Letters Patent is hereby corrected as shown below:

In the Claims

At column 10, line 35, please replace "perature is -60° C.;" with -- perature is -60° C. to 0° C.; --

Signed and Sealed this
Seventh Day of July, 2015

Michelle K. Lee
*Director of the United States Patent and Trademark Office*